A. L. CONVERSE.
Churn.

No. 77,460.

Patented March 5, 1868.

Witnesses:

Inventor:
A. L. Converse
Per Munn & Co
Attorneys

United States Patent Office.

A. L. CONVERSE, OF SPRINGFIELD, ILLINOIS.

Letters Patent No. 77,460, dated May 5, 1868.

IMPROVEMENT IN CHURNS.

*The Schedule referred to in these Letters Patent and making part of the same.*

TO ALL WHOM IT MAY CONCERN:

Be it known that I, A. L. CONVERSE, of Springfield, in the county of Sangamon, and State of Illinois, have invented a new and useful Improvement in Churns; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved churn, so constructed and arranged as to throw the cream into a very violent agitation, bringing the butter quickly and thoroughly, and with a comparatively small outlay of power; and it consists in the combination and arrangement of the four vertical dashers, and of the gearing by means of which the dashers are operated.

Figure 1:
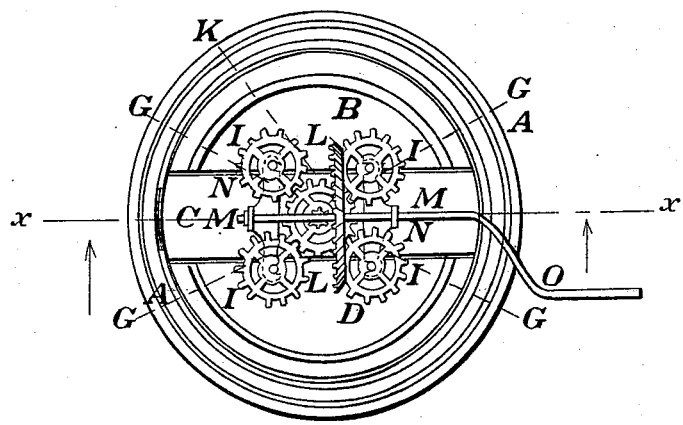
Figure 1 is a top view of my improved churn.
Figure 2:
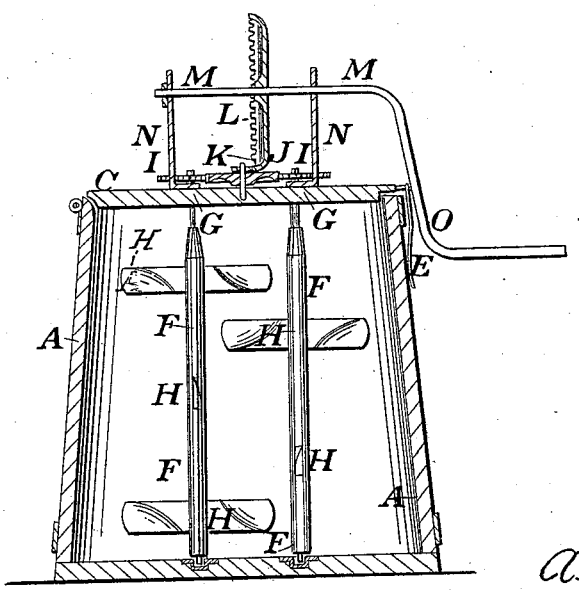
Figure 2 is a vertical section of the same, taken through the line $x\ x$, fig. 1.

A represents an ordinary barrel-churn, the cover of which is made in three parts, B C D. The middle part, C, is hinged at one end to the upper part of the body of the churn, as shown in figs. 1 and 2.

When closed, the other end is secured by a hook, E, or by some other convenient device. The side parts, B and D, of the cover may be set loosely in their places.

F are the vertical dasher-shafts, the lower ends of which revolve in sockets formed in or attached to the bottom of the churn A. The upper ends of the shafts E revolve in notches in the edges of the plates or arms G, attached to the part C of the cover, and projecting over the side edges of said part.

H are the dasher-blades, which project horizontally from the shafts F, are placed at right angles to each other, and at different heights upon each pair of adjacent shafts, and the sides of which are slightly bevelled, so as to pass more easily through the cream.

To the upper end of each of the dasher-shafts F is attached a gear-wheel, I, the teeth of which mesh into the teeth of a central gear-wheel, J, the journal of which revolves in bearings in the centre of the part C of the cover.

To the upper side of the central gear-wheel J is attached, or upon it is formed a small bevel-gear wheel, K, into the teeth of which mesh the teeth of the bevel-gear wheel L, attached to the crank-shaft M. The shaft M revolves in bearings in the upper ends of the arms or supports N, the lower ends of which are secured to the middle part, C, of the cover.

To the end of the shaft M is attached, or upon it is formed, a crank, O, by means of which the churn is operated. By this construction and arrangement each pair of adjacent gear wheels I, and consequently each pair of adjacent dasher-shafts F, will be revolved in opposite directions, the dasher-blades H interlocking with but not touching each other.

This throws the cream into a very violent agitation, the currents formed by the blades of the one dasher being intercepted and broken by the blades of the other dashers, developing all the butter that may be in the cream, and completing the churning in a very short time.

I claim as new, and desire to secure by Letters Patent—

The outer gear-wheels I, central gear-wheels J K, bevelled gear-wheel L, plates G, bearings N, and shaft M, when arranged to operate upon the hinged rectangular central lid C, as herein shown and described.

A. L. CONVERSE.

Witnesses:
ROBT. C. STUTE,
JAMES L. ADAMS.